No. 115,449

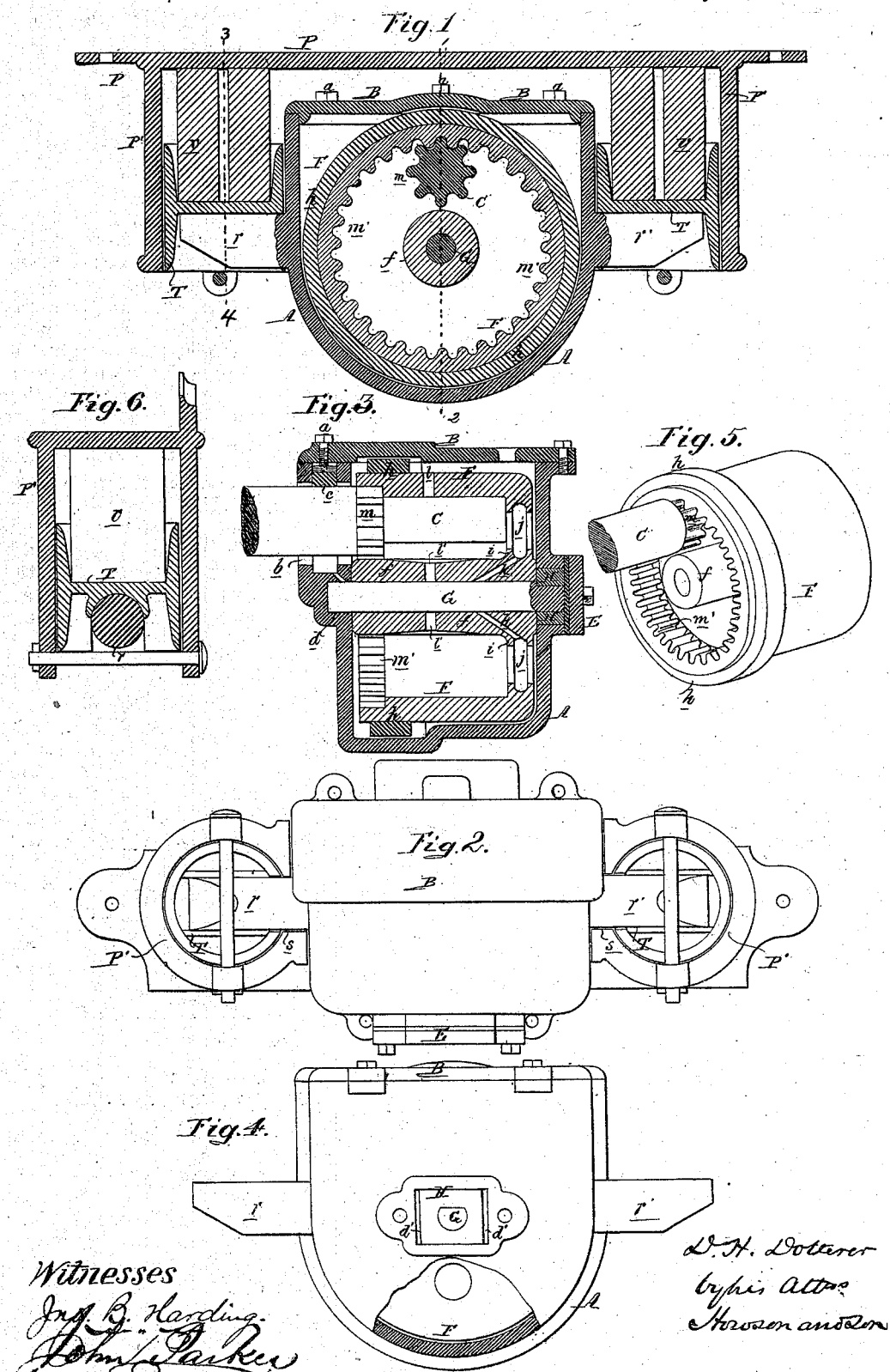

UNITED STATES PATENT OFFICE.

DAVIS HENRY DOTTERER, OF PHILADELPHIA, PENNSYLVANIA.

IMPROVEMENT IN AXLE-BOXES.

Specification forming part of Letters Patent No. 115,449, dated May 30, 1871; antedated May 18, 1871.

I, DAVIS HENRY DOTTERER, of Philadelphia, county of Philadelphia, State of Pennsylvania, have invented certain Improvements in Axle-Boxes and Hangers for the same, of which the following is a specification:

Nature and Object of the Invention.

My invention consists of certain improvements in axle-boxes and hangers, too fully described hereafter to need preliminary explanation, which have been designed with the view of reducing the friction and wear and tear upon both journal and axle-box, and of enabling the latter to yield readily and adapt itself to the various movements of both the body of the car and the journal.

Description of the Accompanying Drawing.

Figure 1 is a sectional view of my improved axle-box and hanger; Fig. 2, a plan of the same; Fig. 3, a sectional view of the box on the line 1 2, Fig. 1; Fig. 4, an exterior view of the box; Fig. 5, a detached perspective view of a portion of the box; and Fig. 6, a sectional view of the hanger on the line 3 4, Fig. 1.

General Description.

The axle-box A is of a curved or semicircular form at the bottom, and has a flat top covered by a lid, B, suitably secured by bolts or screws $a$. In the back of the box is the usual opening $b$ for the admission of the end of the axle, the latter being surrounded within this opening by suitable packing $c$, which prevents the admission of dust into or the escape of lubricating material from the box. The reduced portion or journal C of the axle extends into an annular or bell-shaped bearing, F, which I have devised as a substitute for the bearings heretofore used. It is introduced into the box from the top, and is hung to and arranged to turn upon a pin, G, which extends entirely across the box, one end of the said pin entering a recess, $d$, in the back of the box, and its opposite end, which is partly flattened to prevent the pin from turning, being adapted to a square or rectangular block, H, which is fitted into a correspondingly-shaped but somewhat larger opening, $d'$, formed in the front of the box, and covered by a cap, E, suitably packed to prevent the escape of any lubricating material at this point. (See Figs. 3 and 4.) The block H, when adapted to the opening $d'$, as above described, forms an important feature of my invention, it having a limited horizontal play in the said opening, and thus allowing the pin to which the bearing is hung to adjust itself to a position immediately beneath and on a line with the journal of the axle. This prevents undue friction or unequal wearing of either the journal or bearing by causing the latter to run perfectly true in respect to the journal. The hollow stem or hub $f$ of the bearing extends entirely across the box, and is in contact with both sides of the same. This prevents any longitudinal movement of the bearing upon the pin G, and, by distributing the pressure along the whole length of the latter, destroys whatever tendency there might otherwise be to either bend or break the pin. The long hub also reduces the strain upon the bearing itself, and the latter, which it is proposed to make of cast-iron, is still further strengthened by a band, $h$, of wrought-iron or steel shrunk upon it close to its rear open end. In the web $i$, which connects the hub with the rim of the bearing, there are several openings, $j$, recessed or hollowed out in the center, as plainly shown in Fig. 3, and each communicating, through an inclined passage, $k$, in the hub, with the central opening in the latter, through which passes the pin G. The reare also openings $l$ in the rim of the bearing, and other openings $l'$ in the hub. The box, when in use, is partially filled with oil or other lubricating material, in which the lower portion of the bearing is submerged, so that as the said bearing is turned by the motion of the journal, lubricating material will be constantly carried up and fed to the latter. The hollowed-out or recessed openings $j$ in the web of the bearing also act as receptacles or reservoirs in which lubricating material is carried upward and fed to the pin G through the passages $k$, the pin being also lubricated through the holes $l'$. In order to insure a positive motion of the bearing, and prevent any slipping of the same upon the journal and consequent unequal wear, I gear the journal and bearing together by forming cog-teeth upon the journal at the point $m$, adapted to corresponding internal teeth $m'$ of the bearing.

The advantages possessed by the above box over ordinary boxes with fixed bearings will be evident without further description, while over boxes provided with the ordinary annular bearings it has the following advantages: First, a considerable reduction of friction, as the journal extends into and is in direct contact with a bearing hung directly to the box, instead of with an annular band which passes around a roller as well as around the journal; second, greater compactness; and third, a positive movement of the bearing.

In order that the box may adapt itself to the varying positions of the journal of the axle and at the same time accommodate itself to the movements of the hanger P, by which it is attached to the body of the car, I have devised the arrangement shown in Figs. 1, 2, and 6. The hanger is arranged to be secured directly to the body of the car or truck, and has tubular or cylindrical extensions P' which project downward on both sides of the box. Trunnions r r project from the sides of the box through vertical slots s formed on these extensions of the hanger, and are adapted to sliding boxes or pistons T T within the said extensions, and the springs, instead of being arranged above the box, as usual, are contained within the extensions of the hanger, between the top of the same and the pistons T. These springs, indicated by the letter v in the drawing, consist, in the present instance, of blocks of gum elastic, but strong spiral or other springs may be employed.

Claims.

1. In an axle-box, the combination of the journal of the axle with an annular or bell-shaped bearing, F, hung to and arranged to turn within the box, substantially as described.

2. The said journal and bearing, when geared together to insure a positive movement of the bearing, as set forth.

3. The combination, with the bearing, of a strengthening band or collar, h, of wrought-iron or steel.

4. The combination of the openings j, arranged at the front of the bearing, and recessed at the edges, and passages k for conducting lubricating material from said recessed edges to the pin G, to which the bearing is hung.

5. The pin G, adapted to a recess on one side of the box, and to a block, H, fitted to and arranged to have a limited movement in an opening, d', in the opposite side of the box, all substantially as described.

6. The trunnions I, resting in bearings supported by springs v, as specified.

In testimony whereof I have signed my name to this specification in the presence of two subscribing witnesses.

D. H. DOTTERER.

Witnesses:
WM. A. STEEL,
FRANK. B. RICHARDS.